United States Patent [19]

Miura et al.

[11] Patent Number: 5,542,970
[45] Date of Patent: Aug. 6, 1996

[54] MONOAZO COMPOUND AND RECORDING LIQUID CONTAINING THE SAME

[75] Inventors: Konoe Miura; Hiroshi Takimoto; Tokuya Ohta; Masatsune Kobayashi, all of Yokohama, Japan

[73] Assignees: Canon Kabushiki Kaisha; Mitsubishi Chemical Corporation, both of Tokyo, Japan

[21] Appl. No.: 465,714

[22] Filed: Jun. 6, 1995

Related U.S. Application Data

[63] Continuation of Ser. No. 90,641, Jul. 13, 1993, abandoned, which is a continuation of Ser. No. 667,373, Mar. 12, 1991, abandoned, which is a continuation of Ser. No. 302,991, Jan. 30, 1989, abandoned, which is a continuation of Ser. No. 213,483, Jun. 30, 1988, abandoned, which is a continuation of Ser. No. 862,157, May 12, 1986, abandoned, which is a continuation of Ser. No. 542,977, Oct. 18, 1983, abandoned.

[30] Foreign Application Priority Data

Oct. 27, 1982 [JP] Japan .................. 57-188776

[51] Int. Cl.⁶ .................................................. C09D 11/02
[52] U.S. Cl. ............... 106/20 D; 106/22 R; 534/840; 534/841; 534/862; 534/872; 534/873; 534/879
[58] Field of Search ............................ 534/840, 841, 534/862, 872, 873, 879; 106/22 R, 20 D

[56] References Cited

U.S. PATENT DOCUMENTS

| | | | |
|---|---|---|---|
| 2,102,115 | 12/1937 | Fleischauer et al. | 534/872 |
| 2,892,829 | 6/1959 | Stephen | 260/153 |
| 2,945,021 | 7/1960 | Fasciati et al. | 260/153 |
| 2,973,351 | 2/1961 | de Montmallin et al. | 260/199 |
| 3,705,043 | 12/1972 | Zabiak | 106/22 |
| 3,870,528 | 3/1975 | Edds et al. | 106/22 |
| 4,279,653 | 7/1981 | Makishima et al. | 106/22 |
| 4,325,735 | 4/1982 | Ohta et al. | 106/22 |
| 4,373,954 | 2/1983 | Eida et al. | 106/20 |
| 4,381,946 | 5/1983 | Uehara et al. | 106/22 |
| 4,512,807 | 4/1985 | Ogawa et al. | 106/22 |

FOREIGN PATENT DOCUMENTS

| | | | |
|---|---|---|---|
| 180089 | 2/1906 | Germany . | |
| 272863 | 4/1914 | Germany | 534/872 |
| 609117 | 2/1935 | Germany | 534/872 |
| 1172000 | 6/1964 | Germany | 260/153 |
| 0008361 | 4/1975 | Japan . | |
| 0095008 | 7/1975 | Japan . | |
| 0005769 | 1/1982 | Japan | 106/22 |
| 0141257 | 8/1983 | Japan | 106/22 |
| 0174463 | 10/1983 | Japan | 106/22 |
| 0176265 | 10/1983 | Japan | 106/22 |
| 1359350 | 7/1974 | United Kingdom . | |

OTHER PUBLICATIONS

Industrial & Engineering Chemistry, vol. 17, No. 12, Dec. 1952, pp. 1289–1290.
Beech, *Fibre–Reactive Dyes*, Logos Press Limited, 1970 pp. 116–152.
Colour Index, 3rd Ed., vol. 4 pp. 4115–4119 The Society of Dyer and Colurists (1973).
*The Colour Index*, 3rd Ed, vol. 4, pp. 4149, 4219, 4272, 4332 (1971).

*Primary Examiner*—Shailendra Kumar
*Attorney, Agent, or Firm*—Fitzpatrick, Cella, Harper & Scinto

[57] ABSTRACT

A monoazo compound of the general formula

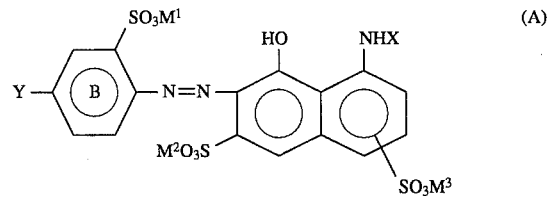

wherein; Y is hydrogen, methyl, methoxy, acetylamino, or nitro, or Y, cojointly with the carbon atom located in the benzene ring B at the 3-position with respect to the N=N group, may form a benzene ring; X is acetyl, benzoyl, p-toluenesulfonyl, or 4-chloro-6-hydroxy-1,3,5-triazine-2-yl; and $M^1$, $M^2$ and $M^3$ each are a base selected from alkali metal atom, ammonium cation and amine salt cation. A recording liquid comprising a coloring matter, which is an image-forming component, and a liquid medium for dissolving or dispersing the coloring matter, said recording liquid being characterized by containing as coloring matter the above-mentioned monoazo compound.

10 Claims, 2 Drawing Sheets

MONOAZO COMPOUND AND RECORDING LIQUID CONTAINING THE SAME

This application is a continuation of application Ser. No. 08/090,641 filed Jul. 13, 1993, which in turn, is a continuation of application Ser. No. 07/667/373, filed Mar. 12, 1991; which is a continuation of application Ser. No. 07/302,991, filed Jan. 30, 1989; which is a continuation of application Ser. No. 07/213,483, filed Jun. 30, 1988; which is a continuation of application Ser. No. 06/862,157, filed May 12, 1986; which is a continuation of application Ser. No. 06/542,977, filed Oct. 18, 1983, each of which is now abandoned.

BACKGROUND OF THE INVENTION

1. Field of the Invention

This invention relates to a novel type of monoazo compound and a novel recording liquid containing the same and is particularly directed to a novel monoazo compound-containing recording liquid suitable for use in a recording system which comprises ejecting recording liquid droplets through fine apertures (discharging orifices) from a recording head to accomplish recording.

2. Description of the Prior Art

For recording on media such as paper and the like with writing tools (fountain pen, felt pen, etc.), there have hitherto been used inks, which are solutions of various dyes in water or in organic solvent.

It is also known that recording liquids of similar compositions are used in the above so-called ink-jet recording systems, in which the ejection of recording liquids is effected by vibration of piezo oscillators, electrostatic attraction due to a high voltage applied, or some other action. However, the recording liquids for the ink-jet recording system is required to satisfy more rigorous performance characteristics in comparison with the recording liquids for writing tools such as fountain pen and felt pen.

There are various types of ink-jet recording systems which are different in the methods of generating recording liquid droplets and of controlling the flying directions of the droplets.

An example thereof is illustrated referring to FIG. 1. The device of FIG. 1 is a recording unit which generates recording liquid droplets in response to signals applied to a piezo oscillator attached to a recording head. In FIG. 1, 1 is the recording head provided with a piezo oscillator 2a, vibrating plate 2b, inlet port 3 for the recording liquid, liquid-holding chamber 4, and discharging orifice 5. The recording liquid 7 is fed into the liquid-holding chamber 4 from a reservoir 6 through a feeding pipe 8. An intermediate treating means 9 such as a pump or filter is provided, if necessary, in the middle of the feeding pipe 8. Recording signals converted into pulsed signals by use of a signal-treating means 10 (e.g. a pulse-generating means) are applied to the piezo oscillator 2a to vary the pressure of the recording liquid in the liquid-holding chamber 4 according to the applied signals. In consequence, the recording liquid 7 is discharged in the form of droplets 11 through the orifice 5 to make a record on the surface of a recording medium 12.

Besides the above, various types of devices are known; for example, a modification of the device of FIG. 1 is known which has, as shown in FIG. 2 (reference numerals in FIGS. 2–4 are the same as those previously used in different Figures, if not expressly stated otherwise), a liquid-holding chamber 4 in a nozzle form and a cylindrical piezo oscillator 2a around the chamber. The mechanism of generating droplets in this device is fundamentally the same as in the device of FIG. 1. According to another known device, electrically charged droplets of recording liquid are continuously produced and parts of the droplets are used for recording. In another known device, thermal energy corresponding to recording signals is applied to the recording liquid in the recording head to produce droplets of the recording liquid.

An example of the device utilizing thermal energy is illustrated referring to FIGS. 3A, 3B and 4. FIG. 3A is a cross-sectional view of a recording head 13 taken in the direction of ink flow and FIG. 3B is the cross-sectional view taken on line A - B of FIG. 3A.

The recording head 13 is made by bonding a glass, ceramic or plastic plate having an ink-passing channel 14 with a heating head 15 for the thermosensitive recording (it is shown in the form of thin films in the figures but is not limited to such a form) which serves to exert thermal energy to the ink. The heating head comprises a protecting film 16 made of, e.g. silicon oxide; aluminum electrodes 17 - 1 and 17 - 2; a heating resistor layer 18 made of, e.g. nichrome; a heat accumulating layer 19; and a substrate 20 made of, e.g. alumina having a good heat-releasing property.

The ink 21 is filled in the channel 14 up to its discharging orifice 22 and forms a meniscus by the action of pressure P.

On applying an electric signal to the electrodes 17 - 1 and 17 - 2, the heating head 15 rapidly generates heat so that bubbles are formed in the ink 21 whereby a meniscus of the ink is projected by the action of the resulting pressure, and an ink droplet 24 is discharged through the orifice 22 and flys toward a recording medium 25. FIG. 4 shows an external appearance of a multi-head, which is an array of such heads as shown in FIG. 1. The multi-head is made by bonding a glass plate 27 having a number of channel 26 with a heating head similar to the one illustrated in FIG. 3A to a suitable substrate 28.

The recording liquid used for ink-jet recording is basically composed of coloring matter (a dye or pigments) and a liquid medium (water, various organic solvents and mixtures thereof can be employed) for dissolving or dispersing it, and if necessary, contains some additives. Recording liquids of this type have been disclosed in, for example, Japanese Patent. Publication Nos. 8361/1975, 40484/1976, 13126/1977 and 13127/1977 and Japanese Patent Laid-Open No. 95008/1975.

For the ink-jet recording liquid, more strict performance characteristics are requested than for the general writing ink. Such requested performance characteristics are as follows:

(1) Physical properties of recording liquid such as viscosity, surface tension and electric conductivity are to meet discharge conditions (e.g. piezo element-driving voltage and frequency; size, shape and material of orifice).

(2) It is stable during a long-term storage without causing orifice clogging.

(3) It is quickly fixed onto recording media such as paper, film and the like, the outlines of the resulting ink dots are smooth, and blotting of the dotted ink is minimized.

(4) The color of the resulting image is clear and dense.

(5) The resulting image is excellent in wet fastness and light fastness.

(6) It does not attack any of materials (its container, connecting tubes, sealants, etc.) in contact therewith.

(7) It has no unpleasant smell, toxicity, inflammability, or the like.

It is very difficult for the recording liquid to secure the above characteristics at the same time. The above-cited recording liquids of the prior art are unsatisfactory in this point.

Characteristics of the recording liquid are much dependent upon properties of the coloring matter since the recording liquid is basically composed of coloring matter and its solvent or dispersing medium as stated above. Accordingly, it is very important in the art to choose coloring matter so as to provide the recording liquid with the above requested characteristics.

SUMMARY OF THE INVENTION

An object of this invention is to provide a novel monoazo compound suitable as coloring matter of a recording liquid which satisfies the above noted requirements (1) to (7) of performance characteristics at the same time.

Another object of this invention is to provide a recording liquid which contains such a monoazo compound and satisfies the above noted requirements.

According to one aspect of this invention, there is provided a monoazo compound of the general formula

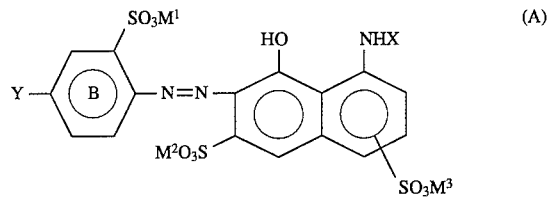

(A)

wherein; Y is hydrogen, methyl, methoxy, acetylamino or nitro, or Y, cojointly with the carbon atom located in the benzene ring B at the 3-position with respect to the N=N group, may form a benzene ring; X is acetyl, benzoyl, p-toluenesulfonyl or 4-chloro-6-hydroxy-1,3,5-triazine-2-yl; and $M^1$, $M^2$ and $M^3$ each are a base selected from alkali metal atom, ammonium cation, and amine salt cation.

According to another aspect of this invention, there is provided a recording liquid comprising coloring matter, which is an image-forming component, and a liquid medium for dissolving or dispersing the coloring matter, said recording liquid being characterized by containing as coloring matter a monoazo compound of the general formula (A)

wherein; Y is hydrogen, methyl, methoxy, acetylamino, or nitro, or Y, cojointly with the carbon atom located in the benzene ring B at the 3-position with respect to the N=N group, may form a benzene ring; X represents acetyl, benzoyl, p-toluenesulfonyl, or 4-chloro-6-hydroxy-1,3,5-triazine-2-yl; and $M^1$, $M^2$ and $M^3$ each are a base selected from alkali metal atom, ammonium cation, and amine salt cation.

DETAILED DESCRIPTION OF PREFERRED EMBODIMENTS OF THE INVENTION

Figure 1:
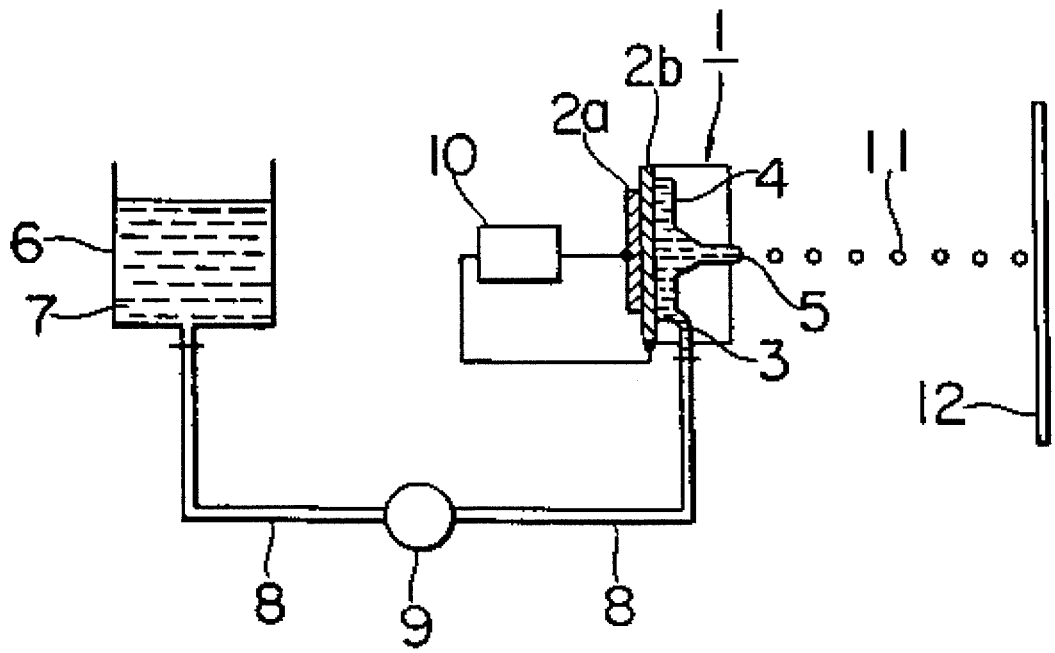
FIGS. 1 and 2 are schematic illustrations of ink-jet recorders.
Figure 2:
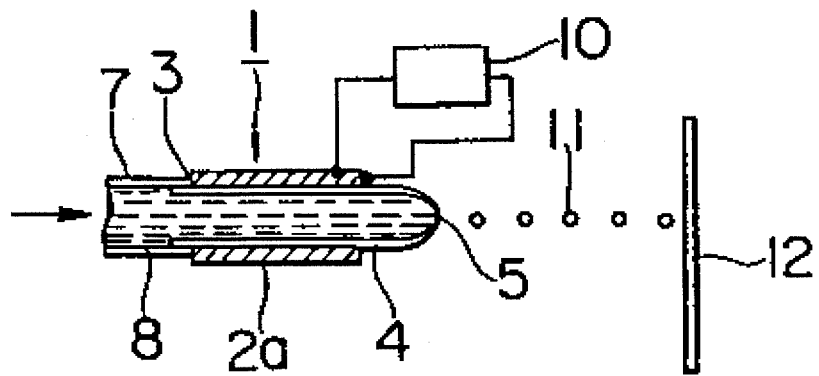
Figure 3A:
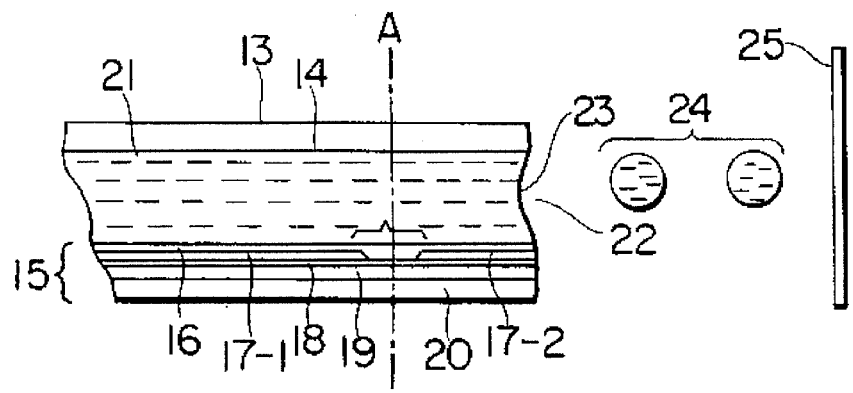
FIGS. 3A and 3B are vertical and transverse sectional views of the head of another ink-jet recorder, respectively.
Figure 3B:
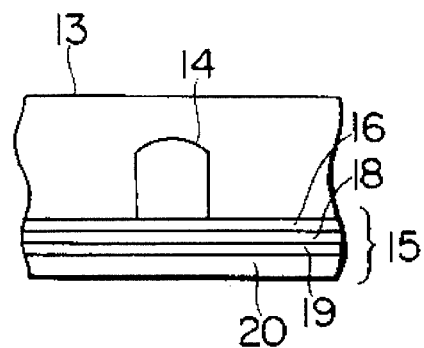
Figure 4:
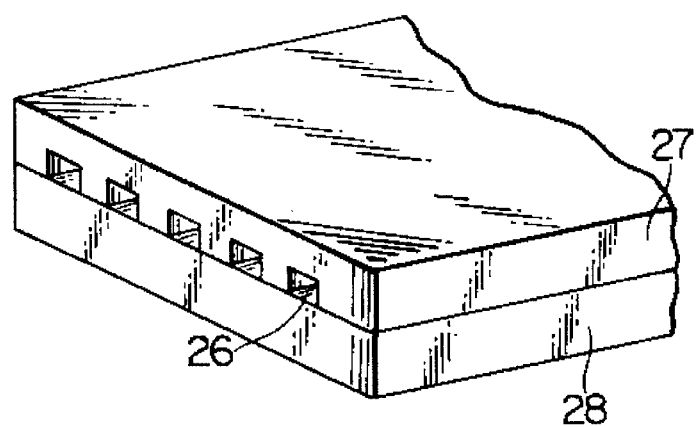
FIG. 4 is a perspective view of a multi-head which is an array of such heads as shown in FIGS. 3A and 3B.

Examples of the monoazo compound of this invention are listed in Table 1.

TABLE 1

| Compound No. | Structural formula | Main absorption maxima (nm) |
|---|---|---|
| No. 1 | 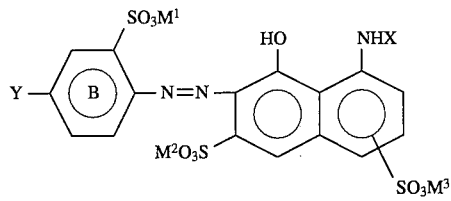 | 517 and 530 |
| No. 2 | | 525 and 549 |
| No. 3 | | 530 |

TABLE 1-continued

| Compound No. | Structural formula | Main absorption maxima (nm) |
|---|---|---|
| No. 4 | | 536 |
| No. 5 | | 539 |
| No. 6 | | 527 and 547 |
| No. 7 | | 519 and 539 |
| No. 8 | | 528 |
| No. 9 | | 505 and 519 |
| No. 10 | | 513 and 538 |
| No. 11 | | 515 and 536 |

TABLE 1-continued

| Compound No. | Structural formula | Main absorption maxima (nm) |
|---|---|---|
| No. 12 | | 507 and 528 |
| No. 13 | | 517 |
| No. 14 | | 522 and 546 |
| No. 15 | | 530 and 563 |
| No. 16 | | 531 and 560 |
| No. 17 | | 519 and 549 |
| No. 18 | | 525 |

TABLE 1-continued

| Compound No. | Structural formula | Main absorption maxima (nm) |
|---|---|---|
| No. 19 | | 518 |
| No. 20 | | 521 |
| No. 21 | | 513 |
| No. 22 | | 528 |
| No. 23 | | 503 and 524 |
| No. 24 | | 521 and 529 |

These monoazo compounds are superior to the prior art coloring matter for ink-jet recording liquids in the above characteristics requested.

For instance, the compound of this invention is distinctly superior to the following known compound No. 101 in the light fastness of the resulting image and to the following known compound No. 102 in the stability during a long-term storage and in anti-clogging property.

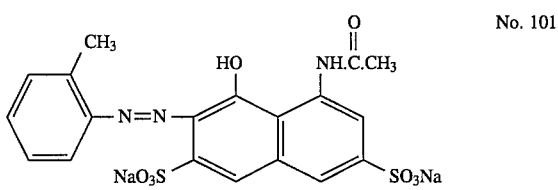

No. 101

-continued
(Acid Red - 35)

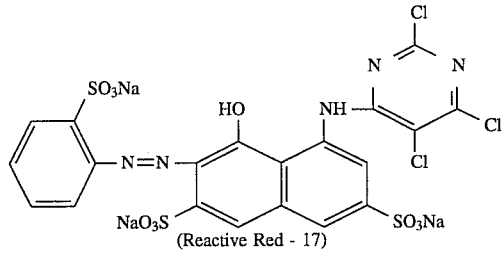
(Reactive Red - 17)

The compound of this invention can be readily prepared in the same manner as the above cited known dyes or dyes of similar structure, according to the methods described by Y. Hosoda in "Theoretical and Production Chemistry of Dyestuff", p.580, lines 5–11, (Jul. 15, 1968) and in "New Dyestuff Chemistry", p.441, line 26 - p.442, line 12, (Dec. 21, 1973), both published by Gihodo Co., Ltd.; that is, by diazotizing an amine of the general formula

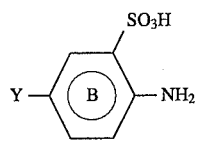 (B)

(Y is the same as defined in the formula A) with sodium nitrite in a dilute mineral acid such as hydrochloric acid or sulfuric acid, followed by coupling of the diazo compound with a naphthol derivative of the general formula

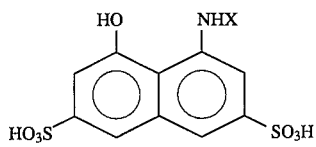 (C)

(x is the same as defined in the formula A).

According to this invention, a recording liquid can be obtained which; has physical properties such as viscosity and surface tension within proper respective ranges and a high fixing rate; does not cause clogging of a fine orifice; does not change any of its own physical properties or precipitate solid matter, during storage; can be applied to various recording media without any particular restriction; and forms high density images superior in fastness to water, light, and rubbing and in the degree of resolution.

The content of the monoazo compound, i.e. the dye, of this invention in the recording liquid is chosen depending upon the kinds of liquid medium components 1 and the desired characteristics of the recording liquid, but is generally 0.1–20%, desirably 0.5–15%, and preferably 1–10%, by weight based on the whole weight of recording liquid. The recording liquid of this invention may contain one or more of these monoazo dyes as essential components with or without any of other various dyes such as direct dyes and acid dyes.

Water or mixtures of water with a water-miscible organic solvent can be employed as liquid medium of the recording liquid in this invention. Examples of the water-miscible organic solvent are; $C_1$–$C_4$ alcohols such as methanol, ethanol, n-propanol, isopropanol, n-butanol, sec-butanol, tert-butanol, and isobutanol; amides such as dimethylformamide and dimethylacetamide; ketones or ketone alcohols such as acetone and diacetone alcohol; ethers such as tetrahydrofuran and dioxane; nitrogen-containing heterocyclic ketones such as N-methyl-2-pyrrolidone and 1,3-dimethyl-2-imidazolidinone; polyalkylene glycols such as polyethylene glycol and polypropylene glycol; $C_2$–$C_6$ alkylene glycols such as ethylene glycol, propylene glycol, butylene glycol, triethylene glycol, thiodiglycol, hexylene glycol, and diethylene glycol; 1,2,6-hexanetriol; glycerol; and lower alkyl ethers of polyhydric alcohols such as ethylene glycol methyl ether, diethylene glycol methyl (or ethyl) ether, and triethylene glycol monomethyl (or monoethyl) ether.

The content of the water-miscible organic solvent in the recording liquid is generally 5–95%, desirably 10–80%, and preferably 20–50%, by weight based on the whole weight of recording liquid.

The water content for this is chosen from a wide range depending upon the kinds of liquid medium components, the composition of the liquid medium, and desired characteristics of the recording liquid, but is generally 10–90%, desirably 10–70%, and preferably 20–70%, by weight based on the whole weight of recording liquid.

The recording liquid of this invention prepared from the above components is in itself superior and well balanced in recording performance characteristics (signal responsiveness, stability for producing droplets, discharge stability, long-hour continuous workability, and discharge stability after a long rest), storage stability, fixability to recording media, and light fastness, weather resistance, and wet fastness of the resulting image. However, known miscellaneous additives also may be incorporated into the above recording liquid for the purpose of further improving such characteristics. Such additives include, for example, viscosity modifiers such as poly (vinyl alcohol), cellulosic resins, and other water-soluble resins; various kinds of surfactants cationic, anionic, and nonionic; surface tension modifiers such as diethanolamine and triethanolamine; pH conditioners such as buffer solutions; and fungicides. For preparing a recording liquid to be used in the type of ink-jet recording system based on the electrical charging of recording liquid, an inorganic salt such as lithium chloride, ammonium chloride, or sodium chloride is added as a resistivity modifier.

When the recording liquid is used in the type of ink-jet recording system based on the action of thermal energy, thermal properties (e.g. specific heat, coefficient of thermal expansion, and heat conductivity) of the recording liquid may sometimes be conditioned.

This invention is illustrated in more detail with reference to the following Examples:

EXAMPLE 1

A uniform slurry was prepared by adding 17.3 g of orthanilic acid to 346 ml of 3% hydrochloric acid and stirring the mixture for 3 hours. The slurry was cooled to 3° C. by adding 200 g of ice. Thereto was added a solution of 7.3 g of sodium nitrite in 73 ml of water. The mixture was stirred at 3° C. for 1 hour to effect the diazotization. Then, the remaining sodium nitrite was destroyed by adding 3 g of sulfanilic acid to the reaction mixture.

On the other hand, 42.3 g of N-benzoyl H-acid was added to 850 ml of water and the pH was adjusted to 9 by adding 20 ml of 25% aqueous caustic soda to dissolve the N-benzoyl H-acid. To the resulting solution cooled to 3° C. by adding 800 g of ice, were added the above diazonium solution, 200 g of ice, and 35 ml of 25% aqueous caustic soda to conduct the coupling while keeping the pH at 8–10 and the temperature at 2°–5 ° C. After 5-hour stirring of the reaction mixture at the same temperature, 500 g of sodium chloride was added to salt out coloring matter, which was then filtered off and washed with 500 ml of 20% aqueous sodium chloride solution. The resulting wet cake was desalted and dried, giving 53.9 g of the intended dye of the formula (Compound No. 1)

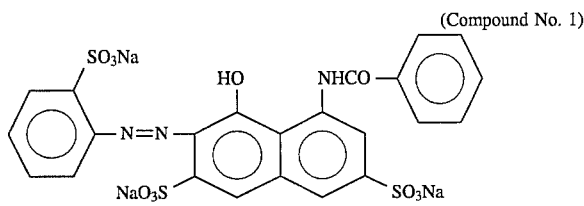

Analysis, Calcd.(%): C, 41.0; H, 2.1; N, 6.2; S, 14.3. Found (%): C, 40.7; H, 1.8; N, 6.4; S, 13.9.

Absorption maxima(nm): 517, 530.

EXAMPLE 2

A uniform slurry of 18.7 g of 4-aminotoluene-3-sulfonic acid in 380 ml of 3% hydrochloric acid was prepared by 3-hour stirring. The slurry was cooled to 3° C. by adding 200 g of ice. Thereto was added a solution of 7.3 g of sodium nitrite in 73 ml of water. The mixture was stirred at 3° C. for 1-hour to effect the diazotization. Then, the remaining sodium nitrite was destroyed by adding 3 g of sulfanilic acid to the reaction mixture.

On the other hand, 42.3 g of N-benzoyl H-acid was added to 850 ml of water and the pH was adjusted to 9 by adding 20 ml of 25% aqueous caustic soda to dissolve the N-benzoyl H-acid. The resulting solution was cooled to 3° C. by adding 800 g of ice. Thereto were added the above diazonium solution, 200 g of ice, and 35 ml of 25% aqueous caustic soda to conduct the coupling while keeping the pH at 8–10 and the temperature at 2°–5° C. After 5-hour stirring of the reaction mixture at the same temperature, 500 g of sodium chloride was added to salt out coloring matter, which was then filtered off and washed with 500 ml of 20% aqueous sodium chloride solution. The resulting wet cake was desalted and dried, giving 52.2 g of the intended dye of the formula (Compound No. 2)

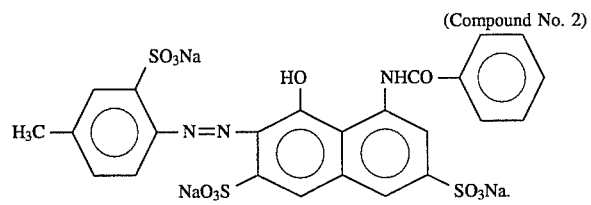

Analysis, Calcd.(%): C, 42.4; H, 2.4; N, 6.2; S, 14.1. Found (%): C, 42.4; H, 2.1; N, 6.0; S. 13.7.

Absorption maxima(nm): 525, 549.

EXAMPLE 3

A uniform slurry of 22.3 g of tobias acid in 450 ml of 5% hydrochloric acid was prepared by 3-hour stirring. The slurry was cooled to 3° C. by adding 300 g of ice. Thereto was added a solution of 7.3 g of sodium nitrite in 73 ml of water. The mixture was stirred at 3° C. for 1-hour to effect the diazotization. Then, the remaining sodium nitrite was destroyed by adding 3 g of sulfanilic acid to the reaction mixture.

On the other hand, 36.1 g of N-acetyl H-acid was added to 750 ml of water and the pH was adjusted to 9 by adding 20 ml of 25% aqueous caustic soda to dissolve the N-acetyl H-acid. The resulting solution was cooled to 3° C. by adding 800 g of ice. Thereto were added the above diazonium solution, 200 g of ice, and 70 ml of 25% aqueous caustic soda to conduct the coupling while keeping the pH at 8–10 and the temperature at 2°–5° C. After 5-hour stirring of the reaction mixture at the same temperature, 500 g of sodium chloride was added to salt out coloring matter, which was then filtered off and washed with 500 ml of 20% aqueous sodium chloride solution. The resulting wet cake was desalted and dried, giving 47.1 g of the intended dye of the formula (Compound No. 7)

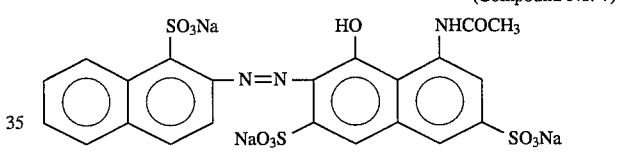

Analysis, Calcd. (%): C, 39.9; H, 2.1; N, 6.4; S, 14.5. Found (%): C, 40.1; H, 1.8; N, 6.2; S, 14.4.

Absorption maxima (nm): 519, 539

EXAMPLES 4–24

In the same manner as in Examples 1–3, amines of the general formula (B) were diazotized and coupled with naphthol derivatives of the general formula (C), respectively, to give the compounds of Table 2, wherein absorption maxima of the prepared compounds are also shown.

TABLE 2

| Example No. | Compound No. | Structural formula | Main absorption maxima (nm) |
| --- | --- | --- | --- |
| No. 4 | No. 3 | ![structure] | 530 |
| No. 5 | No. 4 | ![structure] | 536 |

TABLE 2-continued

| Example No. | Compound No. | Structural formula | Main absorption maxima (nm) |
|---|---|---|---|
| No. 6 | No. 5 | 4-O$_2$N-2-(NaO$_3$S)-C$_6$H$_3$–N=N–[1-HO-3-(NaO$_3$S)-6-(NaO$_3$S)-8-(NHSO$_2$-C$_6$H$_4$-4-CH$_3$)-naphthalen-2-yl] | 539 |
| No. 7 | No. 6 | 1-(NaO$_3$S)-naphthalen-2-yl–N=N–[1-HO-3-(NaO$_3$S)-6-(NaO$_3$S)-8-(NHCO-C$_6$H$_5$)-naphthalen-2-yl] | 527 and 547 |
| No. 8 | No. 8 | 1-(NaO$_3$S)-naphthalen-2-yl–N=N–[1-HO-3-(NaO$_3$S)-6-(NaO$_3$S)-8-(NHSO$_2$-C$_6$H$_4$-4-CH$_3$)-naphthalen-2-yl] | 528 |
| No. 9 | No. 9 | 2-(LiO$_3$S)-C$_6$H$_4$–N=N–[1-HO-3-(LiO$_3$S)-5-(LiO$_3$S)-8-(NHCO-C$_6$H$_5$)-naphthalen-2-yl] | 505 and 519 |
| No. 10 | No. 10 | 4-H$_3$C-2-(NaO$_3$S)-C$_6$H$_3$–N=N–[1-HO-3-(NaO$_3$S)-5-(NaO$_3$S)-8-(NHCO-C$_6$H$_5$)-naphthalen-2-yl] | 513 and 538 |
| No. 11 | No. 11 | 1-(NaO$_3$S)-naphthalen-2-yl–N=N–[1-HO-3-(NaO$_3$S)-5-(NaO$_3$S)-8-(NHCO-C$_6$H$_5$)-naphthalen-2-yl] | 515 and 536 |
| No. 12 | No. 12 | 1-(NaO$_3$S)-naphthalen-2-yl–N=N–[1-HO-3-(NaO$_3$S)-5-(NaO$_3$S)-8-(NHCOCH$_3$)-naphthalen-2-yl] | 507 and 528 |
| No. 13 | No. 13 | 1-(NaO$_3$S)-naphthalen-2-yl–N=N–[1-HO-3-(NaO$_3$S)-5-(NaO$_3$S)-8-(NHSO$_2$-C$_6$H$_4$-4-CH$_3$)-naphthalen-2-yl] | 517 |

TABLE 2-continued

| Example No. | Compound No. | Structural formula | Main absorption maxima (nm) |
|---|---|---|---|
| No. 14 | No. 14 | | 522 and 546 |
| No. 15 | No. 15 | | 530 and 563 |
| No. 16 | No. 16 | | 531 and 560 |
| No. 17 | No. 17 | | 519 and 549 |
| No. 18 | No. 18 | | 525 |
| No. 19 | No. 19 | | 518 |

TABLE 2-continued

| Example No. | Compound No. | Structural formula | Main absorption maxima (nm) |
|---|---|---|---|
| No. 20 | No. 20 | [structure] | 521 |
| No. 21 | No. 21 | [structure] | 513 |
| No. 22 | No. 22 | [structure] | 528 |
| No. 23 | No. 23 | [structure] | 503 and 524 |
| No. 24 | No. 24 | [structure] | 521 and 529 |

In the following Examples, "parts" are all by weight.

EXAMPLE 25

Water (71 parts) demineralized by ion exchanger (hereinafter, simply referred to as water), diethylene glycol (25 parts), and 4 parts of the dye (Compound No. 1) were thoroughly mixed to dissolve the dye. The solution was filtered under pressure through a 1μ pore size Teflon filter and degassed in vacco to give a recording liquid.

The thus obtained recording liquid was subjected to the following tests $T_1$–$T_5$ by using an on-demand type of ink-jet recording head which discharges droplets of a recording liquid with piezo oscillators (orifice dia. 50μ, piezo oscillator-driving voltage 60 V, frequency 4 KHz). The results were all satisfactory. ($T_1$) Long-term storage stability of recording liquid:

After the specimen had been sealed in glass containers and stored for 6 months at –30° C. or 60° C., no deposition of insoluble matter was observed and no change occurred in physical properties or in color of the specimen.

($T_2$) Discharge stability:

The specimen subjected to a continuous discharge test for 24-hour at room temperature, 5° C. or 40° C. gave good quality images constantly throughout the test period under all the conditions.

($T_3$) Discharge responsiveness:

Tests of discharging intermittently the specimen at two-second intervals and of discharging after standing for two months showed stable uniform recording without causing clogging of the orifice in both the cases.

($T_4$) Quality of images formed:

Image formed by use of the specimen were of high optical density and sharp and clear. These images, exposed to ambient light in a room for three months, showed only 1% or less drop in optical density. Immersion of the recorded paper sheets in water for one minute gave very little blotting of the images.

($T_5$) Fixability to various kinds of recording paper:

Images formed by use of the specimen on the following kinds of paper were rubbed with a finger 15 seconds after recording, and the shift and blotting of the rubbed parts of images were inspected. The results indicated none of the shift and blotting, proving a good fixability of the recording liquid.

| Tradename of paper | Paper grade or type | Maker |
| --- | --- | --- |
| Ginkan | High quality | Sanyo Kokusaku Pulp. Co.,Ltd. |
| Seven star | " | Hokuetsu Seishi Co.,Ltd. |
| Haku-botan | Medium quality | Honshu Seishi Co.,Ltd. |
| Toyo Filter Paper No.4 | Non sized type | Toyo Roshi Co.,Ltd. |

EXAMPLE 26

A recording liquid of the following composition was prepared in the same manner as in Example 25.

| Composition: | |
| --- | --- |
| Water | 62 parts |
| N-Methyl-2-pyrrolidone | 15 parts |
| Diethylene glycol | 19 parts |
| Dye(Compound No.2) | 4 parts |

This recording liquid was subjected to the tests $T_1$–$T_5$ in the same manner as in Example 25 but using an on-demand type of ink-jet recording multi-head which discharges droplets of recording liquid by the action of thermal energy (orifice dia. 35μ, resistance of heating resistor 150 Ω, operational voltage 30 V, frequency 2 KHz). The results were all satisfactory.

EXAMPLE 27

In the same manner as in Example 25, a recording liquid of the following composition was prepared and subjected to the tests $T_1$–$T_5$ but using an on-demand type of ink-jet recording multi-head (the same that used in Example 26). The results were all satisfactory.

| Composition: | |
| --- | --- |
| Water | 45 parts |
| Ethylene glycol | 20 parts |
| 1,3-Dimethyl-2-imidazolidinone | 30 parts |
| Dye(Compound No.9) | 5 parts |

EXAMPLE 28

In the same manner as in Example 25, a recording liquid of the following composition was prepared and subjected to the tests $T_1$–$T_5$ but using an on-demand type of ink-jet recording multi-head (the same that used in Example 26). The results were all satisfactory.

| Composition: | |
| --- | --- |
| Water | 60 parts |
| Diethylene glycol | 36 parts |
| Dye(Compound No.13) | 4 parts |

EXAMPLE 29

In the same manner as in Example 25, a recording liquid of the following composition was prepared and subjected to the tests $T_1$–$T_5$ but using an on-demand type of ink-jet recording multi-head (the same that used in Example 26). The results were all satisfactory.

| Composition: | |
| --- | --- |
| Water | 66 parts |
| Diethylene glycol monomethyl ether | 30 parts |
| Dye(Compound No.17) | 4 parts | cl EXAMPLES 30–34

In the same manner as in Example 25, recording liquids of the following compositions (Examples 30–34) were prepared. These recording liquids were separately filled in felt pens and writing tests were conducted on a medium quality grade of paper (tradename: Haku-botan, made by Honshu Seishi Co., Ltd.) by using these pen. In the tests, wet fastness of written images and the writing property after 24-hour standing of the pens with the caps being removed were examined.

The results indicated that the recording liquids of these Examples were superior in the wet fastness and the writing property after standing.

| | | |
| --- | --- | --- |
| Example 30 | Water | 71 parts |
| | Diethylene glycol | 25 parts |
| | Dye(Compound No.17) | 4 parts |
| Example 31 | Water | 45 parts |
| | Ethylene glycol | 20 parts |
| | N-Methyl-2-pyrrolidone | 30 parts |
| | Dye(Compound No.20) | 5 parts |
| Example 32 | Water | 60 parts |
| | Ethylene glycol monomethyl ether | 35 parts |
| | Dye(Compound No.22) | 5 parts |
| Example 33 | Water | 76 parts |
| | Diethylene glycol | 20 parts |
| | Dye(compound No.24) | 4 parts |
| Example 34 | Water | 60 parts |
| | N-Methyle-2-pyrrolidone | 15 parts |
| | Ethylene glycol dimethyl ether | 20 parts |
| | Dye(Compound No.3) | 5 parts |

Further, recording liquids were prepared by substituting, in the composition of Example 30, Compound Nos. 4, 5, 6, 7, 8, 10, 11, 12, 14, 15, 16, 18, 19, 21 and 23 for Compound No. 17. All of these recording liquids also gave similar good results.

What we claim is:

1. An ink-jet recording liquid comprising an image forming coloring matter component and a liquid medium comprising water and a water-miscible organic solvent for dissolving or dispersing the coloring matter, said recording liquid being characterized by containing as said coloring matter a desalted monoazo compound of the formula

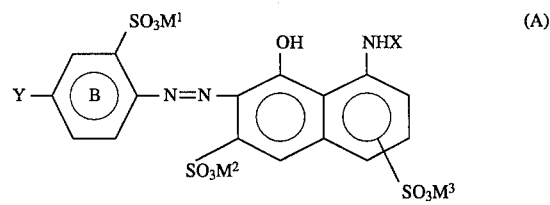

wherein Y is hydrogen, methyl or methoxy; X is p-toluenesulfonyl; and $M^1$, $M^2$, and $M^3$ are selected from the group consisting of alkali metal atom, ammonium cation, and amine salt cation.

2. The recording liquid of claim 1, wherein the content of a dye represented by the formula (A) is 0.1–20% by weight based on the whole weight of the recording liquid.

3. The recording liquid of claim 1, wherein said water-miscible organic solvent is selected from the group consisting of $C_1$–$C_4$ alcohols, amides, ketones, ketone alcohols, ethers, nitrogen-containing heterocyclic ketones, polyalkylene glycols, $C_2$–$C_6$ alkylene glycols, 1,2,6-hexanetriol, glycerol, and lower alkyl ethers of polyhydric alcohols.

4. The recording liquid of claim 3, wherein the content of said water-miscible organic solvent is 20 to 50 weight percent and the content of said coloring matter is 0.1 to 20 weight percent of the whole recording liquid.

5. The recording liquid of claim 1, wherein Y is methyl or methoxy.

6. The recording liquid of claim 5, wherein Y is methyl.

7. An ink-jet recording liquid comprising a magenta image forming coloring matter component and a liquid medium comprising water and a water-miscible organic solvent for dissolving or dispersing the coloring matter, said recording liquid being characterized by containing as said coloring matter a desalted monoazo compound of the formula

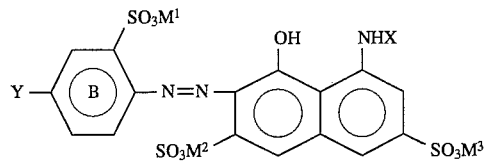

wherein Y is methyl; X is benzoyl; and $M^1$, $M^2$, and $M^3$ are selected from the group consisting of alkali metal atom, ammonium cation, and amine salt cation.

8. The recording liquid of claim 7, wherein the content of a dye represented by the formula is 0.1–20% by weight based on the whole weight of the recording liquid.

9. The recording liquid of claim 7, wherein said water-miscible organic solvent is selected from the group consisting of $C_1$–$C_4$ alcohols, amides, ketones, ketone alcohols, ethers, nitrogen-containing heterocyclic ketones, polyalkylene glycols, $C_2$–$C_6$ alkylene glycols, 1,2,6-hexanetriol, glycerol, and lower alkyl ethers of polyhydric alcohols.

10. The recording liquid of claim 9, wherein the content of said water-miscible organic solvent is 20 to 50 weight percent and the content of said coloring matter is 0.1 to 20 weight percent of the whole recording liquid.

* * * * *

UNITED STATES PATENT AND TRADEMARK OFFICE
CERTIFICATE OF CORRECTION

PATENT NO. : 5,542,970  
DATED : August 6, 1996  
INVENTOR(S) : KONOE MIURA, ET AL.

It is certified that error appears in the above-indentified patent and that said Letters Patent is hereby corrected as shown below:

On title page,
OTHER PUBLICATIONS:

[56] "Dyer and Colurists" should read --Dyers and Colourists--.

COLUMN 1:

Line 36, "is" should read --are--.

COLUMN 2:

Line 31, "flys" should read --flies--.

COLUMN 11:

Line 49, "components 1" should read --components--.

UNITED STATES PATENT AND TRADEMARK OFFICE
CERTIFICATE OF CORRECTION

PATENT NO. : 5,542,970
DATED : August 6, 1996
INVENTOR(S) : KONOE MIURA, ET AL.

It is certified that error appears in the above-indentified patent and that said Letters Patent is hereby corrected as shown below:

COLUMN 22:

Line 20, "pen." should read --pens.--.

Signed and Sealed this

Twenty-second Day of April, 1997

*Attest:*

BRUCE LEHMAN

*Commissioner of Patents and Trademarks*

*Attesting Officer*